(12) United States Patent
Shelton et al.

(10) Patent No.: US 7,377,091 B2
(45) Date of Patent: May 27, 2008

(54) CORN HEAD WITH REEL DEVICE AND METHOD OF USE

(75) Inventors: Britt C. Shelton, Woolstock, IA (US); Darrel E. Hay, Webster City, IA (US)

(73) Assignee: Shelton/Hay LLC, Woolstock, IA (US)

( * ) Notice: Subject to any disclaimer, the term of this patent is extended or adjusted under 35 U.S.C. 154(b) by 186 days.

(21) Appl. No.: 11/352,854

(22) Filed: Feb. 13, 2006

(65) Prior Publication Data

US 2006/0185339 A1 Aug. 24, 2006

Related U.S. Application Data

(60) Provisional application No. 60/654,132, filed on Feb. 18, 2005.

(51) Int. Cl.
*A01D 45/02* (2006.01)
(52) U.S. Cl. .......................................... 56/119
(58) Field of Classification Search .................. 56/119, 56/106, 294, 14.5, 364, 14.6; 198/676; 15/80
See application file for complete search history.

(56) References Cited

U.S. PATENT DOCUMENTS

| | | | | |
|---|---|---|---|---|
| 3,399,517 A | * | 9/1968 | Magee | 56/13.9 |
| 3,508,387 A | * | 4/1970 | Wright | 56/95 |
| 3,584,444 A | * | 6/1971 | Sammann et al. | 56/119 |
| 3,589,111 A | * | 6/1971 | Gullickson et al. | 56/12.8 |
| 3,719,034 A | * | 3/1973 | Lange | 56/119 |
| 3,742,687 A | * | 7/1973 | Kalkwaf | 56/119 |
| 4,085,570 A | * | 4/1978 | Joray et al. | 56/2 |
| 4,137,695 A | * | 2/1979 | Sammann | 56/119 |
| 4,142,348 A | | 3/1979 | Jordan et al. | |
| 4,476,667 A | * | 10/1984 | Moss | 56/119 |
| 4,584,825 A | * | 4/1986 | Atkinson | 56/119 |
| 4,967,544 A | | 11/1990 | Zieglar et al. | |
| 6,672,042 B2 | | 1/2004 | Gengenbach | |
| 2002/0073673 A1 | | 6/2002 | Gengenbach | |
| 2003/0172639 A1 | | 9/2003 | Calmer | |
| 2004/0016219 A1 | | 1/2004 | Calmer | |

\* cited by examiner

*Primary Examiner*—Árpád Fábián-Kovács
(74) *Attorney, Agent, or Firm*—McKee, Voorhees & Sease, P.L.C.

(57) ABSTRACT

An improved corn head includes a reel device that prevents debris build-up in front of a feederhouse. The reel device includes support arms, a crossbar between the support arms, and a number of radial bars extending from the crossbar. The reel device has a number of adjustments to optimally position the radial bars for removing debris. The reel device rotates to reduce debris build-up in the feederhouse during harvesting. The reel device is moveable between operative and inoperative positions from the combine cab using hydraulics.

20 Claims, 5 Drawing Sheets

CORN HEAD WITH REEL DEVICE AND METHOD OF USE

CROSS-REFERENCE TO RELATED APPLICATIONS

This application claims priority under 35 U.S.C. § 119 of Provisional Application Ser. No. 60/654,132 filed Feb. 18, 2005, which application is hereby incorporated by reference in its entirety.

BACKGROUND OF THE INVENTION

The present invention relates generally to corn heads for use with combines and specifically to an improved corn head using a reel device to reduce debris build-up.

Combines that harvest corn are provided with several snouts for directing rows of corn stalks to ear separation chambers, into an auger, through a feederhouse and into a combine's inner chambers which separate the corn kernels from the corn cob.

Combine operators routinely encounter difficulties when harvesting corn especially with debris building up in front of a feederhouse of the combine. Previously, combines that harvested only 4 or 8 rows encountered this debris build-up only occasionally because the corn yields experienced were low, the varieties of hybrid corn dropped their leaves sooner, thicker plant spacing resulting in more corn fodder to process, the speed of the combine moving through the field was slow, and not as many rows of corn were being harvested.

Advances in plant science have caused an increase in the amount of debris experienced by the combine operator. A modern combine experiences these problems much more frequently because today's corn varieties retain their leaves longer, utilizing corn planted more densely in the rows and more closely together, extremely high corn yields and operating the combine at much faster speeds. Much of the increase in corn yields has come from genetic improvements to the corn plant through biotechnology or genetic modifications. This yield increase has brought with it larger, healthier corn plants that produce larger amounts of debris that may potentially break off the stalk and have to be ingested by the combine. Still further creating problems, the typical size of a feederhouse has remained unchanged relative to the horsepower and threshing capacity of today's modern combines. Today's machines have in excess of 400 hp engines and can process more than 4000 bushels of corn per hour versus machines of 10 years ago that had 200 horsepower and could harvest 2000 bushels of corn per hour. While it would make sense to double the size of the feederhouse opening on these new machines in this process, that has not been the case. Instead the feederhouse opening has remained virtually unchanged.

Further complicating this problem is the plastic material from which much of the "snouts" or row dividers are made. This plastic material when constantly rubbed by plant material may develop a static charge which potentially causes the debris to adhere to the plastic material, to the steel on the backboard of the head, and to other plant material. Relative humidity in the fall typically drops to 20% or less in the corn belt which aids the buildup of this static charge.

Severe debris buildup results from dry harvest conditions. This debris is made up of corn stalks, leaves, and "fluff" which is fine particles of ground up stalks and leaves. The debris is not a problem once it moves past the feederhouse. Debris is processed by the combine into mulch and returned to the field to decay through the winter months. However, getting the debris into the feederhouse may be a problem because the debris and fluff together may form an obstruction which hinders and/or blocks corn from entering into a combine for processing. In order to prevent this obstruction, the operator must slow down or stop, thereby letting the feederhouse remove this debris. If the operator cannot prevent the debris from forming an obstruction, the operator must climb out of the combine cab and try to remove the debris by hand or using a tool. Any type of manual removal of this debris is hazardous to the operator and may cause injury or death to the operator. For example, the operator often must travel in between the snouts and reach up into the debris pile with a broom handle to clear the debris. Should the corn head be left on, the operator has risk of serious injury.

Therefore, the debris problem creates two issues. One, a time issue in which the operator is losing valuable time because they are removing debris or slowing down and stopping to have the machine removes the debris. Two, a safety issue in that the operator is exposed to risk of injury by trying to manually unclog an obstruction of debris in the feederhouse.

Therefore, an objective of the present invention is to overcome the problem of debris build-up in front of the feederhouse.

A further objective of the present invention is to provide an adjustable device which optimizes the removal of debris in front of the feederhouse.

Still another objective of the present invention is the provision of rotating bars which can be actuated from the cab of the combine to unclog debris from the feederhouse.

Yet another objective of the present invention is the provision of a frame with rotatable bars which is moveable between operative and inoperative positions.

Another objective of the present invention is the provision of a debris clearing device which can be retrofit to various combines.

A further objective of the present invention is the provision of a device that is economical to manufacture, simple to install, and effective and durable in use.

These and other objectives will become apparent from the following specification and drawings.

SUMMARY OF THE INVENTION

The foregoing objectives may be obtained using an improved corn head with a reel device that reduces debris build-up. The improved corn head includes a frame defining a feederhouse and a channel leading to the feederhouse, an auger within the channel for directing material toward the feederhouse, and a plurality of crop dividing snouts extending forward from the frame. The reel device is attached to the frame and extends forward from the frame. The reel device has first and second support arms attached to the frame outside the feederhouse and extending forward from the frame, a crossbar rotatably attached in the first and second support arms, radial bars attached to the crossbar positioned over the snouts and on top of the auger, and a crossbar drive to rotate the crossbar and radial bars.

A feature of the present invention includes a 10°-15° bend in the radial bars 5 inches from the attachment point of the radial bars to the cross bar.

A further feature of the present invention is a set of two radial bars for each corn head snout that are separately spaced approximately 180° from one another.

A further feature of the present invention is offsetting adjacent sets of radial bars by 90°.

A further feature of the present invention is a pivotal joint on each of the first and second support arms that permit the reel device to move between a raised position and a lowered position. This pivotal joint has multiple holes where a pin is inserted to allow adjustment of the down position.

A further feature of the present invention are adjustable sections which permit changes in the position of the crossbar relative to the auger, adjustments to the length of the crossbar to permit changes in the position of the support arms relative to the feederhouse, and adjustments to the reel positions to allow changes in the position of the radial bars over the snouts.

A further feature of the present invention is to provide radial bars over at least five snouts that define four crop rows especially those immediately in front of the feederhouse and adjacent the feederhouse. Corn heads configured to harvest 30 inch rows require one set of radial bars per row while 36 and 38 inch rows require 2 sets over the middle 3 snouts or hoods. Corn heads configured for 20 inch rows require one set of radial bars over the middle 7 hoods. The length of the axle or cross bar is the same for both 20" and 30" corn heads and longer for the 34" and 36" corn heads. Alternatively, the cross bar may have an adjustable length, through telescoping members or extension pieces.

The foregoing objectives may also be achieved by a reel device that may be provided separately from the corn head for later attachment to the corn head. The reel device having support arms attached to the corn head frame, a crossbar rotatably attached between the support arms, radial bars having a first end attached to the crossbar with a 10°-15° bend 5 inches from the attachment point that is designed to move a great amount of debris towards the feederhouse with a minimal propensity to wrap crop debris around the crossbar.

The foregoing objectives may also be achieved with a method of using an improved corn head with a reel device that includes the steps aligning the radial bars over the snouts, harvesting corn using the corn head when environmental conditions produce debris, and operating the reel device to reduce debris build-up.

A further feature of the present invention includes the step of pivoting the reel device to an upper position when not required to remove debris.

A further feature of the present invention is the step comprising adjusting the support bars to place the radial bars over the auger within the range of 1-2" and preferably 1" away from the auger flighting and 1-3" and preferably 2" away from the hood which is the cover separating each row gathering unit.

A further feature is the provision of radial bars which are non-perpendicular to the axis of the cross bar so as to enhance debris clearance from the feederhouse.

DETAILED DESCRIPTION OF THE PREFERRED EMBODIMENT

Figure 1:
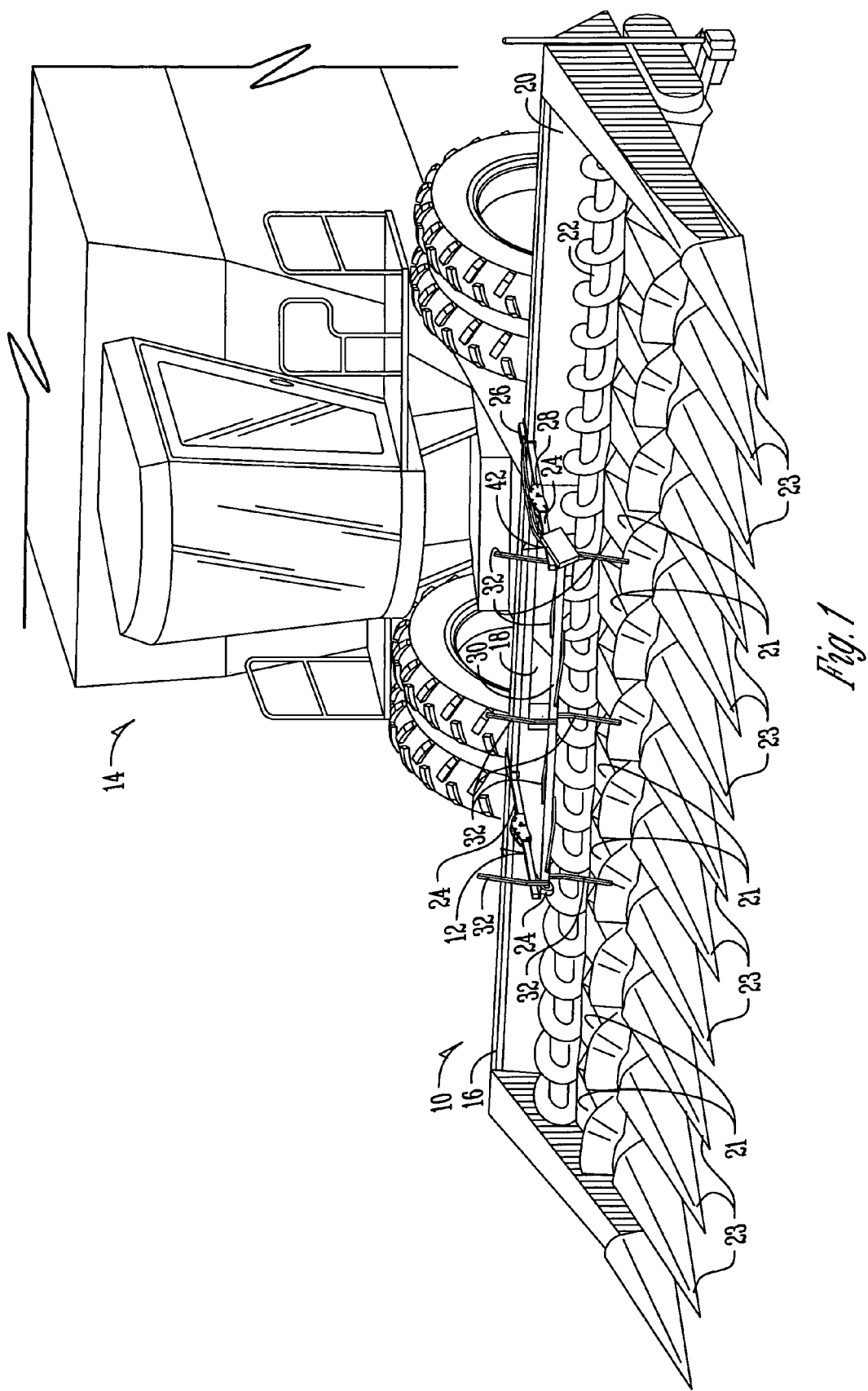
FIG. 1 is a perspective view of the reel device of the present invention on a corn head of a combine.

With reference to the figures and particularly to FIG. 1, the improved corn head is generally referred to by numeral 10. The reel device 12 is an improvement to the corn head 10 of a combine 14 that prevents debris build-up in front of the feederhouse 18.

The corn head 10 has a frame 16 that provides a support structure for the reel 12. The feederhouse 18 is defined in the frame 16 that provides an opening to move ears of corn and debris from the snouts 23 of the corn head into the internal workings of the combine. A channel 20 is provided on the frame 16 to receive harvested ears of corn and an auger 22 moves the material inwardly from the lateral sides of the corn head 10 to the feederhouse 18. A hood 21 is the cover in front of the channel that separates each row unit. The frame 16, feederhouse 18, channel 20, hood 21, auger 22, and snouts 23 are conventional.

As ears of corn and debris move towards the feederhouse, the corn being heavier than the debris settles into the channel and moves into the feederhouse whereas the debris being lighter than the corn rises to the top of the channel. Under ideal operating conditions, the debris and corn cobs both are fed into the feederhouse simultaneously. Unfortunately, debris may continue to build-up in front of the feederhouse and on top of the hoods until it forms an obstruction and prevents corn from moving into the feederhouse. At this point, an operator would be required to remove the obstruction of debris from the feederhouse. However, with use of the reel device 12, the debris does not form an obstruction. Instead, as the debris begins to accumulate in front of and on top of the cross auger 22, it is moved rearward and into the feederhouse 18.

The reel device 12 has opposite support arms 24. The support arms 24 are attached to the frame 16 in any convenient manner, such as a bracket or clamp 26. The bracket or clamp 26 may utilize a threaded fastener, be welded to the frame, and/or utilize other attachment means. Differences in head manufacturer's frame designs are overcome by changing the design of the bracket or clamp 26. For example, on certain combine models the bracket 26 may be bolted to the front side of the frame directly behind and above the cross auger. Different types of brackets 26 may be used on other corn heads.

Extending between the support arms 24 is a crossbar 30. The crossbar 30 is rotatably mounted between the support arms 24. Radial bars 32 extend from the crossbar 30. As illustrated, each set of two opposing radial bars 32 are spaced 180° apart on the crossbar 30. These radial bars 32 that comprise a set of crossbars may be offset from one another by 90°. This offsetting provides interaction by the reel device 12 with a debris pile in 90° rotational increments.

Figure 2A:
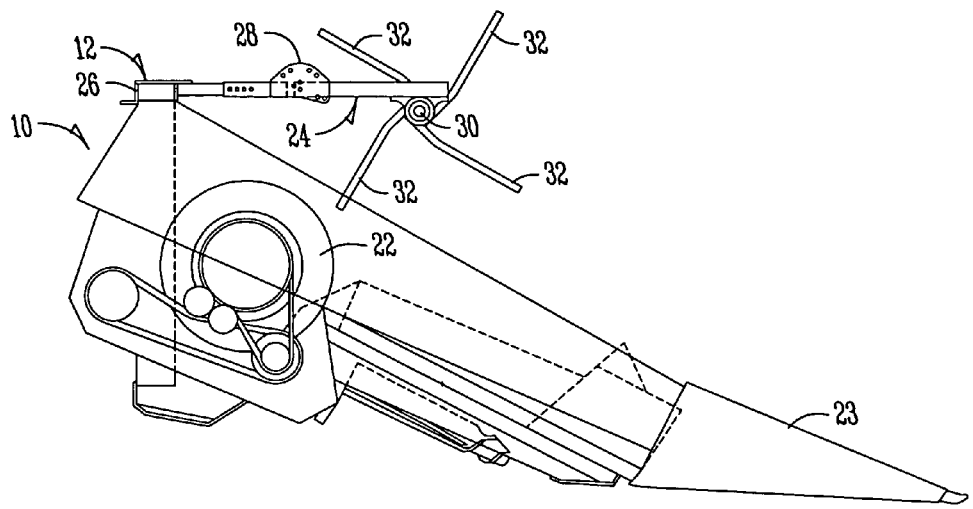
FIG. 2A is a side elevation view of the improved corn head with the reel device of the present invention in a lowered, operative position.
Figure 2B:
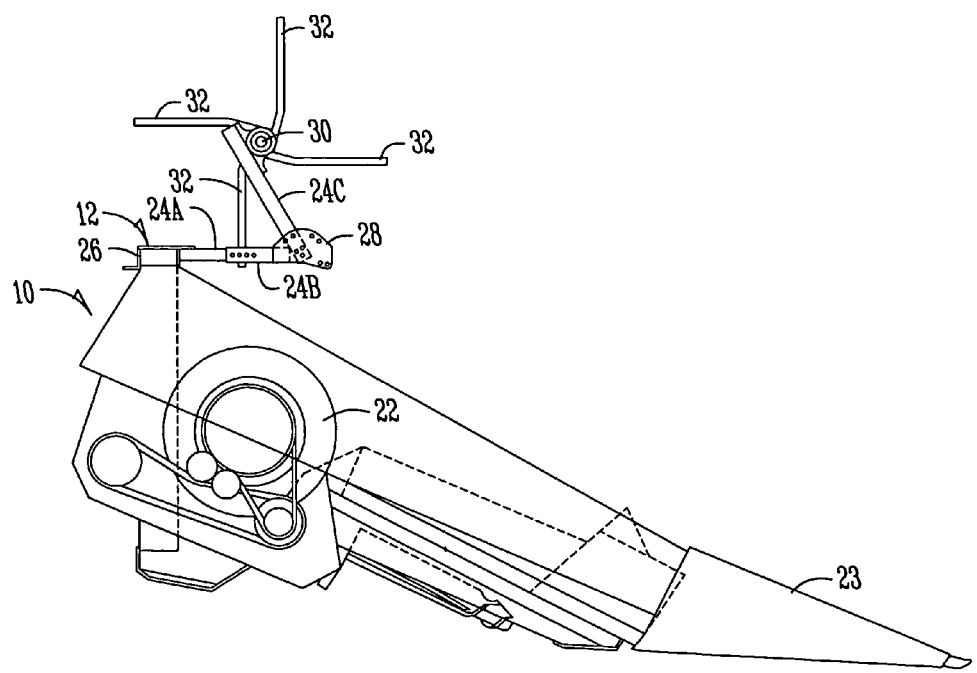
FIG. 2B is a side elevation view of the improved corn head with the reel device in a raised, inoperative position.

As seen in FIGS. 2A and 2B, a pivot point 28 is provided on the support arms 24 that permit the movement of the reel device 12 between a raised inoperative position and a lowered operative position.

Figure 5:
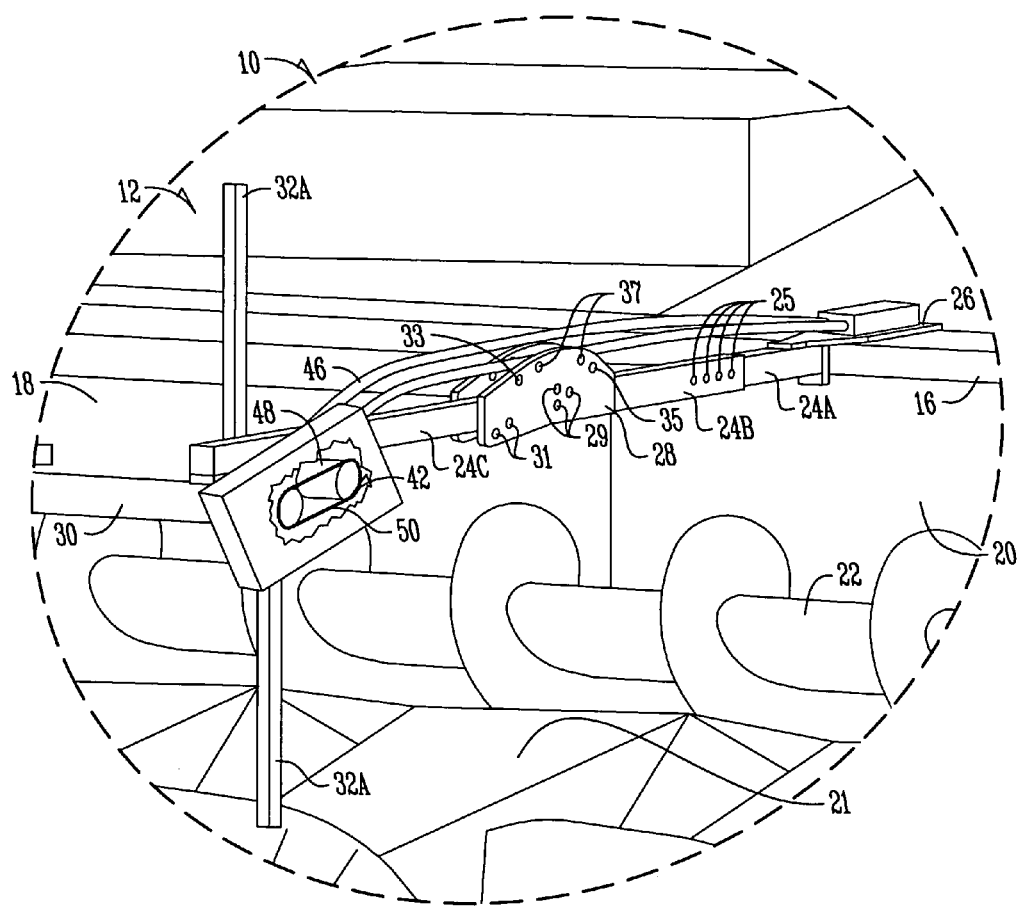
FIG. 5 is an enlarged view of the crossbar drive for rotating the cross bar and radial bars and showing an alternative, straight bar embodiment.

The reel device 12 has a variety of different adjustments possible. Each of the support arms 24 is adjustable in length to permit the radial bars 32 to be moved close to or away from the auger 22. As best seen in FIG. 5, the arms 24 include telescoping segments 24A and 24B with a plurality of holes 25. A pin or bolt (not shown) extends through one of the holes to secure the segments 24A and B for a selected length of the arm 24.

A pair of hinge plates 28 are welded or otherwise fixed to the outer end of the segment 24B of the support arms 24, as best seen in FIG. 5. Each hinge plate has a plurality of holes 29, which provide numerous pin placements to allow proper positioning or placement of the outer ends of the segments 24C of the arms 24 relative to the hoods 21 and the auger 22. More particularly, a pin (not shown) extends through one of the holes 29, and through the segment 24C of the arm 24 to pivotally connect the segment 24C to the hinge plates 28. A plurality of holes 31 at the forward end of the plates are adapted to receive a pin (not shown) which extends beneath the segment 24C of the arm 24 to further allow adjustment of the position of the outer end of the segment 24 relative to the hoods 21 and the auger 22. A hole 31 in the plates 28 is adapted to receive a pin (not shown) to limit upward movement of the reel 12 when the reel is in the lowered, operative position. Another hole 35 on the upper portion of the plates 28 is adapted to receive a pin (not shown) so as to limit rearward movement of the arm segment 24C when the reel 24 is in the raised, inoperative position. If desired, the arm segments 24C can be maintained in a substantially vertical position when folded upwardly by a pair of pins received in holes 37 in the upper portion of the hinge plates 28, with the pins being on opposite sides of the segment 24C.

Figure 3:
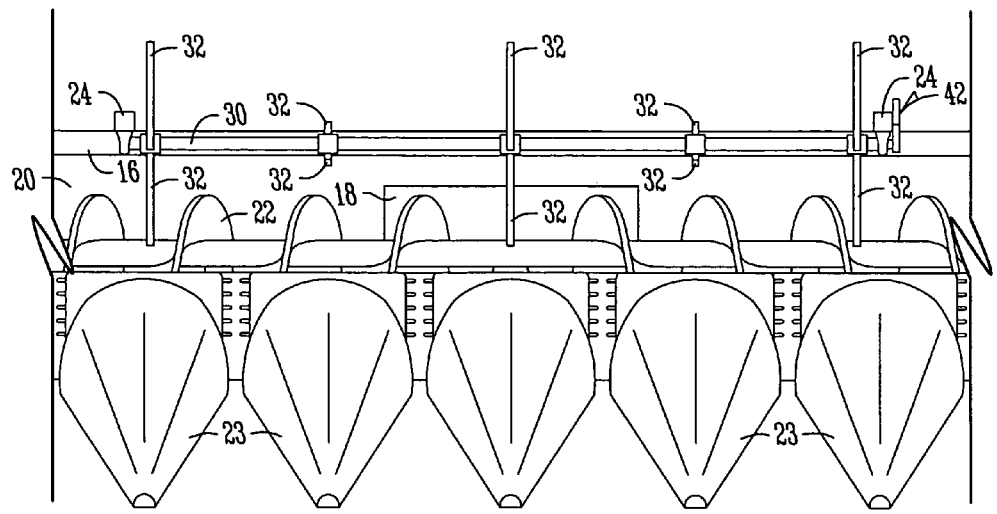
FIG. 3 is a front elevation view of the improved corn head with the reel device in a lowered position.
Figure 4:
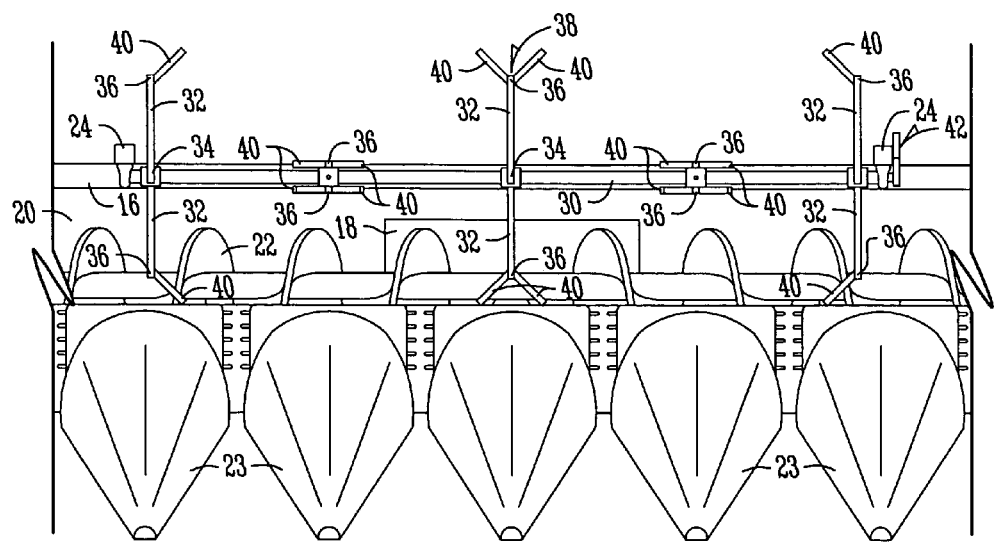
FIG. 4 is a front view of an improved corn head with the reel device using radial bars having angled members at an outer end of the radial bars.

As seen in FIGS. 3 and 4, adjustments may be provided to the crossbar 30 to align the radial bars 32 with the snouts 23. Additionally, adjustments may be made to the crossbar 30 to assure placement on the outside of the feederhouse 18.

Figure 6:
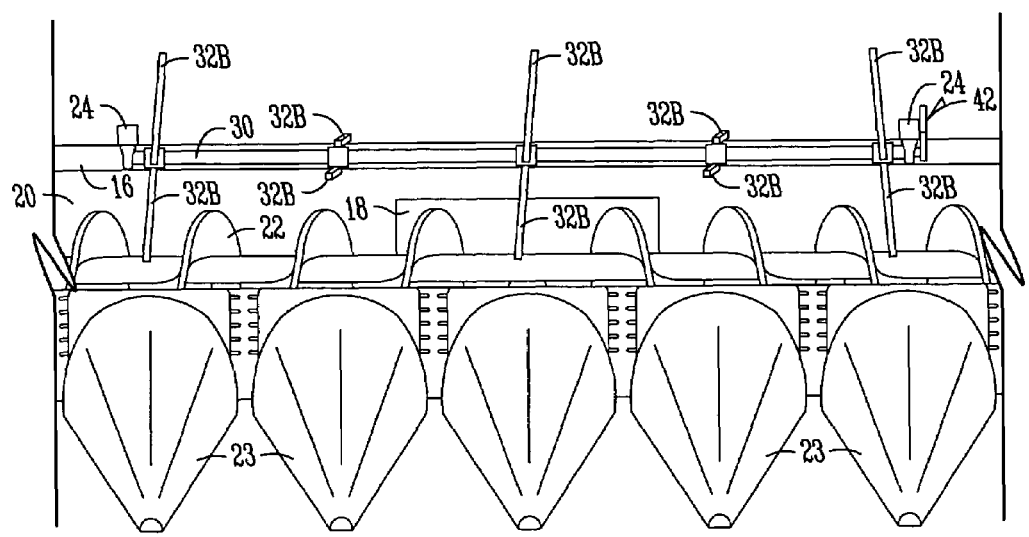
FIG. 6 is a view similar to FIG. 3 showing another embodiment of the radial bars oriented at a non-perpendicular angle relative to the cross bar axis.

Each radial bar 32 has a first end 34 connected to the crossbar 30 and a second end spaced outward from the crossbar 30. The second end may be a blunt end or it may have V-shaped fork 38 which has two angled snouts 40 or may have a single angled snout. In a preferred embodiment, the radial bar is bent approximately 10°-15°, and preferably 12°, 5" from the attachment point of the ends 34 to the cross bar 30. This bend in the bars 32 helps to prevent wrapping of cornstalks around the cross bar 30. The outer end 34 of each radial bar 32 is preferably blunt. In an alternative embodiment, the radial bars 32A are straight, as seen in FIG. 5, without the 10°-15° bend. In yet another embodiment, the radial bars 32B are secured to the cross bar 30 so as to be disposed at a non-perpendicular angle relative to the axis of the cross bar 30, as seen in FIG. 6. With such an angle, the bars 32B cover a wider swath as the cross bar 30 rotates, as compared to the bars 32.

As illustrated in FIG. 5, the crossbar 30 is rotated by a drive chain 42. The drive chain 42 is powered by hydraulic hoses 46 and a hydraulic motor 48. The hydraulic motor 48 turns the chain 42 which is trained about a sprocket on 44 on the end of the cross bar 30 and a sprocket 50 on the end of the motor 48. A chain guard 52 prevents the chain from becoming clogged with debris and later falling off and processed through the combine. The hydraulic hoses 46 may be connected to the hydraulic system of the corn head 10.

In the drawings and specification there has been set forth a preferred embodiment of the invention, and although specific terms are employed, their use is in a generic descriptive sense only and not for purposes of limitation.

Changes in the form in proportion and parts as well as in substitution of equivalent are contemplated as a circumstance may suggest or render expedience without departing from the spirit or scope of the invention and various claims. For example, the present invention contemplates variations in the drive system, the number of radial bars utilized, the position of the radial bars 32 relative to the corn head snouts, and other variations in structure and function.

What is claimed is:

1. An improved corn head that reduces debris build-up, comprising:
   a frame with a feederhouse and a channel leading to the feederhouse;
   an auger within the channel for directing material toward the feederhouse;
   a plurality of crop row dividing snouts extending forward from the frame, and each snout having a longitudinal axis;
   a reel device attached to the frame and extending forwardly from the frame;
   the reel device having:
      first and second support arms attached to the frame and extending forwardly from the frame;
      a crossbar rotatably attached between the first and second support arms;
      radial bars attached to the crossbar and being substantially centered on the axis of the snouts and above the snouts to clear debris from the feederhouse;
      a drive to rotate the crossbar and radial bars to clear debris from the feederhouse.

2. The improved corn head of claim 1 wherein the reel device further comprises a 10°-15° bend on the radial bars.

3. The improved corn head of claim 1 wherein the reel device has a set of two radial bars for each snout that are spaced approximately 180° from one another.

4. The improved corn head of claim 3 wherein each set is offset from an adjacent set by approximately 90°.

5. The improved corn head of claim 1 wherein the first and second support arms are pivotal between a raised position and a lowered position.

6. The improved corn head of claim 1 wherein the length of the first and second support arms is adjustable to allow changes in the position of the crossbar relative the auger.

7. The improved corn head of claim 1 wherein the length of the crossbar is adjustable.

8. The improved corn head of claim 1 wherein the position of the radial bars is adjustable to allow changes in the position of the radial bars over the snouts.

9. The improved corn head of claim 1 wherein the radial bars have an axis oriented at a non-perpendicular angle relative to the crossbars.

10. A reel device that reduces debris build-up on a corn head, the corn head having a frame with a feederhouse and a channel leading to the feederhouse, an auger within the channel for directing material toward the feederhouse, and a plurality of crop row dividing snouts, the snouts being laterally spaced apart to define gaps for receiving standing corn stalks, the device comprising:
   support arms adapted to attach to the frame and extending forwardly from the frame above the snouts and being movable between operative and inoperative positions;
   a crossbar rotatably attached between the support arms;
   radial bars extending outwardly from the cross bar so as to be in close proximity to the auger;
   the bars being aligned over the snouts, and laterally apart from the gaps so as to preclude interference with standing stalks received in the gaps;

a drive to rotate the crossbar and radial bars so as to break up clogged debris adjacent the feederhouse.

11. The reel device of claim 10 wherein the support arms are adapted to attach outside the feederhouse.

12. The reel device of claim 10 wherein the radial bars are adapted to be positioned between about 1-2" away from an outer fighting of the auger.

13. The reel device of claim 10 wherein the radial bars are adapted to be positioned above the auger.

14. The reel device of claim 10 wherein the reel device has a set of two radial bars for each snout that are spaced approximately 180° from one another.

15. The reel device of claim 14 wherein each adjacent set is offset from another by approximately 90°.

16. The reel device of claim 10 wherein the first and second support arms are pivotal between an operative position and an inoperative position.

17. The reel device of claim 10 wherein the radial bars include a 10°-15° bend.

18. The reel device of claim 10 wherein the radial bars have an axis oriented at a non-perpendicular angle to the axis of the cross bar.

19. A method of reducing debris build-up in a corn head, comprising:

having a feederhouse, an auger to direct material toward the feederhouse, and a plurality of crop row dividing snouts with stalk entrance gaps between adjacent snouts;

attaching a reel device to the corn head, the reel device having a crossbar with radial bars extending outwardly therefrom above the snouts and apart from the gaps;

moving the corn head forwardly to receive standing corn stalks into the snout gaps without interference by the bars and thereby harvesting standing corn using the corn head when environmental conditions produce debris; and rotating the reel device to reduce debris build-up in the feederhouse.

20. The method of claim 19 further comprising the step of pivoting the reel device between operative and inoperative positions.

* * * * *